(No Model.)
E. F. GORDON.
DRIVING PULLEY.
No. 488,390. Patented Dec. 20, 1892.
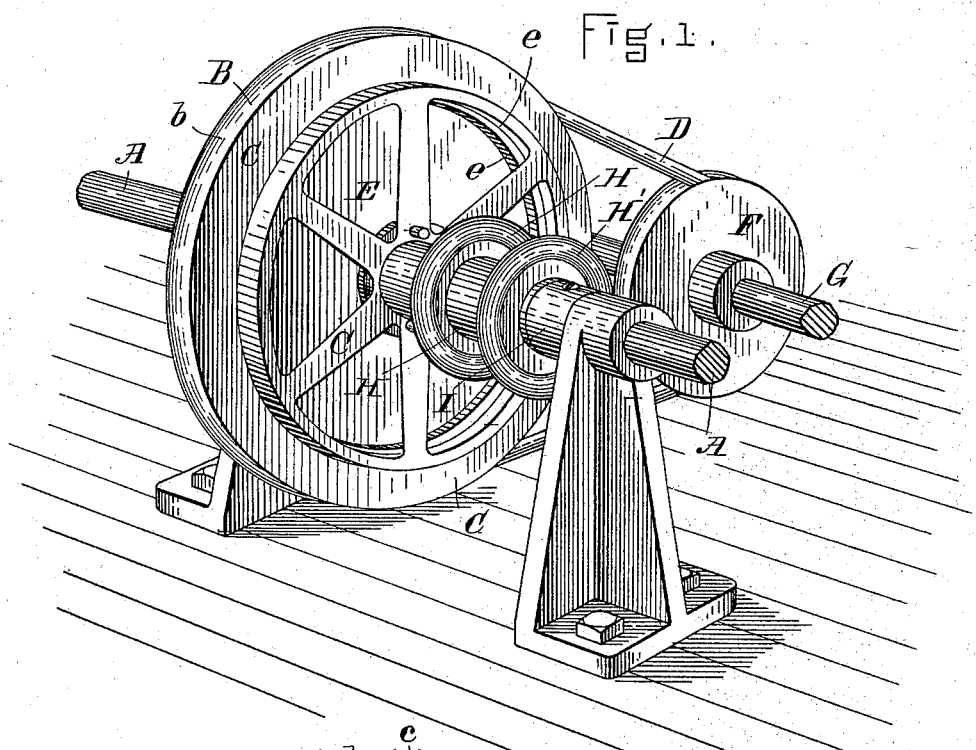
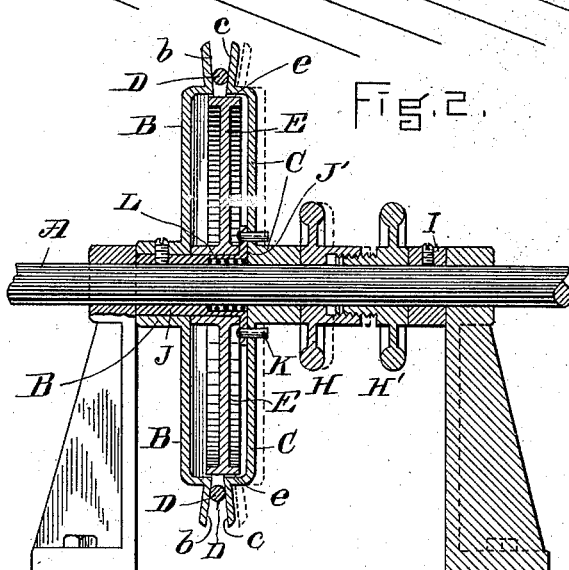
WITNESSES.
R. Henry Marsh.
L. Estella Talmadge
INVENTOR.
Edward F. Gordon.
by N. C. Spencer
Attorney.

UNITED STATES PATENT OFFICE.

EDWARD F. GORDON, OF CONCORD, NEW HAMPSHIRE.

DRIVING-PULLEY.

SPECIFICATION forming part of Letters Patent No. 488,390, dated December 20, 1892.

Application filed April 15, 1892. Serial No. 429,301. (No model.)

*To all whom it may concern:*

Be it known that I, EDWARD F. GORDON, of Concord, in the county of Merrimac and State of New Hampshire, have invented certain new and useful Improvements in Driving-Pulleys, of which the following, taken in connection with the accompanying drawings, is a specification.

The object of my invention is to furnish a driving pulley of greater capacity for transmitting power than any heretofore known and to combine with it an inclosed loose pulley upon which the belt may rest when desired.

My apparatus is especially adapted to the use of round belts or ropes, and narrow, thick belts of leather.

My invention consists in a grooved pulley made in two laterally-separable parts adapted to rotate continuously with their shaft, and provided with hand wheels having threaded hubs surrounding said shaft for moving one part toward and from the other.

It also consists in a two-part driving pulley having oblique and sharply inclined driving surfaces, an interposed spring tending to separate the parts and means mounted on the shaft, independent of the pulley, to press said parts toward each other, in combination with a loose pulley inclosed between the parts of the driving pulley, and adapted to support the belt in a dormant state when desired.

My invention also includes said two-part pulley and inclosed loose pulley in combination with an internal sleeve rotating with the shaft and furnished with projections entering recesses in the laterally-movable part, whereby said part is positively driven although having a limited movement lengthwise of the shaft. The driven pulley may have these laterally-movable parts to adjust it to the width of the belt used, or be made solid with grooved periphery, as desired.

In the drawings, Figure 1 is a perspective view of one of my improved pulleys with connected parts. Fig. 2 is a vertical section in the plane of the driving shaft, showing the internal construction.

A represents the driving shaft mounted in suitable bearings.

B and C are the two laterally-separable parts of my improved pulley, the part B fixed in position on its shaft, and the part C having a limited sliding movement thereon, controlled by suitable means enabling the operator at will to move the part C toward or from the part B while both are in rotation. The working faces $b\ c$ of these parts of the pulley are oblique and sharply inclined toward each other; and these inclined faces bear against the edges or opposite sides of the belt D with pressure varying according to their distance from each other, and they increase the tension of the belt as their approach toward each other forces the belt farther away from the axis of the shaft A. The belt will either be round as shown, or flat and thick with edges slightly inclined, to fit the oblique, converging faces $b\ c$.

Between the parts B and C which constantly revolve with their shaft, I interpose a loose pulley E supported by the shaft, but at no time positively driven. It has a flat peripheral face $e$ upon which the belt D rests when the parts B C are sufficiently far asunder to permit it. In such cases the belt is dormant on such loose pulley, although the two-part pulley B C is in rapid rotation at each side thereof. When the belt is to be actuated and to impart motion to the driven pulley F, and to machines connected thereto by the countershaft G, the part C is pressed toward the part B until they grip the belt D between them, lift it from the idle pulley, and set it in motion. The parts B and C are offset abruptly outward at the foot of their inclined faces, to give interior space for the rim $e$ of the loose pulley E. These parts have also broad seats or lateral hubs at their centers for strength and stiffness.

H H' are two hand wheels mounted on the shaft A adjacent to the hub of the sliding part C of my improved pulley. They turn freely upon the shaft and have internally and externally threaded hubs engaging each other. A collar $l$, fixed on the shaft beside the wheel H' prevents longitudinal movement beyond the desired point. Now when these wheels are turned in opposite directions they speedily slide the part C of the pulley in the desired direction and hold it there. By turning either wheel while the other is held from rotation the sliding movement is effected more slowly. I prefer to employ the internal sleeve J, shown in Fig. 2, fitting closely between and rotating with the shaft A and fixed part B of the two-part pulley, and forming a bushing or enlargement of the shaft within the loose pulley E. This sleeve has a radial flange J' adjacent to the hub of the loose pulley which it keeps from moving longitudinally on the shaft. The flange J' has two or more projecting studs K, entering corresponding holes in the sliding part C of the pulley, this construction allowing said part to move toward and from its felly without independent rotation. A recess in one end of this sleeve receives a spring L, which tends to press the sliding part C away from the part B, when permitted by the hand wheels H H'.

I claim as my invention:

1. A driving pulley formed of two laterally-separable rotating parts with driving faces sharply inclined toward each other, in combination with hand wheels loose on the driving shaft and having threaded hubs, whereby the distance between said parts of the pulley and their grip on the belt, may be varied, substantially as and for the purpose set forth.

2. A driving pulley formed in two laterally-separable rotary parts having oblique and sharply inclined driving surfaces, and an inclosed spring tending to separate them, in combination with a loose pulley inclosed between said rotary parts and having a belt-supporting periphery within and at the foot of said inclined surfaces, and with means mounted on the shaft, independent of the pulley, adapted to press its parts toward each other, substantially as and for the purpose set forth.

3. A two-part driving-pulley with inclined driving surfaces and an inclosed loose pulley with its periphery adjacent to such surfaces, in combination with an internal sleeve rotating with the shaft, formed with a flange controlling the loose pulley and having projections entering recesses in the laterally-movable part of the driving pulley, substantially as and for the purpose set forth.

4. The driving pulley described having laterally-separable parts B C, with inclined driving surface $b$ $c$, and the inclosed loose pulley E with its periphery $e$ beneath such inclined surfaces, in combination with the internal sleeve J around which said loose pulley revolves, the spring L within said sleeve acting to press the part C of the pulley away from the part B, and with the threaded parts H H' adapted to press said parts toward each other, substantially as and for the purpose set forth.

In testimony whereof I have signed my name to this specification, in the presence of two subscribing witnesses, on this 19th day of March, A. D. 1892.

EDWARD F. GORDON.

Witnesses:
A. H. SPENCER,
THOMAS DEAN.

It is hereby certified that in Letters Patent No. 488,390, granted December 20, 1892, upon the application of Edward F. Gordon, of Concord, New Hampshire, for an improvement in "Driving-Pulleys," an error appears in the printed specification requiring the following correction, viz.: In line 11, page 2, the word "felly" should read *fellow;* and that the said Letters Patent should be read with this correction therein that the same may conform to the record of the case in the Patent Office.

Signed, countersigned, and sealed this 23d day of May, A. D. 1893.

[SEAL.]
                                        JNO. M. REYNOLDS,
                                    *Assistant Secretary of the Interior.*

Countersigned:
    JOHN S. SEYMOUR,
        *Commissioner of Patents.*